(12) United States Patent
Golov (10) Patent No.: US 11,951,997 B2
(45) Date of Patent: Apr. 9, 2024

(54) ARTIFICIAL INTELLIGENCE-ENABLED ALARM FOR DETECTING PASSENGERS LOCKED IN VEHICLE

(71) Applicant: Micron Technology, Inc., Boise, ID (US)

(72) Inventor: Gil Golov, Backnang (DE)

(73) Assignee: Micron Technology, Inc., Boise, ID (US)

(*) Notice: Subject to any disclaimer, the term of this patent is extended or adjusted under 35 U.S.C. 154(b) by 591 days.

(21) Appl. No.: 16/783,381

(22) Filed: Feb. 6, 2020

(65) Prior Publication Data

US 2021/0245771 A1 Aug. 12, 2021

(51) Int. Cl.
| | |
|---|---|
| *B60W 50/00* | (2006.01) |
| *B60H 1/00* | (2006.01) |
| *B60R 11/00* | (2006.01) |
| *B60R 11/04* | (2006.01) |
| *G06N 3/08* | (2023.01) |
| *G06V 20/59* | (2022.01) |
| *G08B 21/22* | (2006.01) |

(52) U.S. Cl.
CPC ..... *B60W 50/0098* (2013.01); *B60H 1/00657* (2013.01); *B60R 11/04* (2013.01); *G06N 3/08* (2013.01); *G06V 20/593* (2022.01); *G08B 21/22* (2013.01); *B60R 2011/0003* (2013.01); *B60W 2540/01* (2020.02)

(58) Field of Classification Search
CPC .................................................. B60W 50/0098
See application file for complete search history.

(56) References Cited

U.S. PATENT DOCUMENTS

| | | | | |
|---|---|---|---|---|
| 9,264,608 | B2* | 2/2016 | Lee | H04N 23/611 |
| 9,593,521 | B2* | 3/2017 | Breed | B60R 16/037 |
| 9,712,741 | B2* | 7/2017 | Kothari | B60R 11/0235 |
| 10,057,621 | B2 | 8/2018 | Wexler et al. | |
| 10,836,401 | B1* | 11/2020 | Christensen | B60W 50/0098 |
| 10,858,011 | B1* | 12/2020 | Christensen | B60R 21/20 |
| 10,960,848 | B1* | 3/2021 | Weber, Jr. | B60R 25/1004 |
| 2013/0158644 | A1* | 6/2013 | Qian | B82Y 30/00 |
| | | | | 607/119 |
| 2018/0141562 | A1* | 5/2018 | Singhal | A61B 5/165 |

(Continued)

FOREIGN PATENT DOCUMENTS

| | | |
|---|---|---|
| CN | 110562003 | 6/2018 |
| JP | 2014210477 | 11/2014 |
| KR | 20190098460 | 8/2019 |

OTHER PUBLICATIONS

International Search Report and Written Opinion, PCT/US2021/015511, dated May 14, 2021.

*Primary Examiner* — Jean Paul Cass
(74) *Attorney, Agent, or Firm* — Greenberg Traurig (57) ABSTRACT

The disclosed embodiments are directed to detecting persons or animals trapped in vehicles and providing automated assistance to such persons or animals. In one embodiment a method is disclosed comprising detecting that a vehicle is stopped; activating at least one camera and recording at least one image of an interior of the vehicle using the at least one camera; classifying the at least one image using a machine learning model; and operating at least one subsystem of the vehicle in response to detecting that classifying indicates that a person or animal is present in the at least one image.

20 Claims, 5 Drawing Sheets

(56) References Cited

U.S. PATENT DOCUMENTS

2018/0300568 A1  10/2018  Wu et al.
2019/0176837 A1* 6/2019  Williams .............. B60W 10/30
2019/0258263 A1  8/2019  Wendel et al.

* cited by examiner

ARTIFICIAL INTELLIGENCE-ENABLED ALARM FOR DETECTING PASSENGERS LOCKED IN VEHICLE

FIELD OF THE TECHNOLOGY

The disclosed embodiments are directed towards automotive systems and, in particular, to systems for detecting the presence of a passenger (or other being) locked within an automobile and taking remedial measures based on the detection.

BACKGROUND

Many persons and animals suffer due to being left in locked vehicles. Oftentimes, injuries or death occur primarily in hot weather when temperatures rise significantly when vehicles are parked in direct, or even indirect, sunlight. Various attempts to solve this problem have been made. One such attempt is a warning to a driver prior to the driver existing the vehicle. Another such attempt is the use of weight or motion sensors to detect that persons or animals are within a vehicle after the vehicle is locked. Such approaches suffer from various problems. In the first approach, drivers often ignore such warnings since the warnings are given every time the driver stops the vehicle. In the second approach, the use of motion or weight sensors can either give false positives (due to luggage or other items on seats) or may give false negatives (due to sleeping or unconscious persons or animals). As a result, current systems for detecting humans or animals (collectively "beings") in vehicles fail to adequately detect such being trapped in locked vehicles.

The disclosed embodiments solve these and other technical problems by providing a machine learning (ML) system to automatically detect beings trapped in vehicles and proactively take measures to protect these beings without intervention by the driver of the vehicle.

BRIEF DESCRIPTION OF THE DRAWINGS

The embodiments are illustrated by way of example and not limitation in the figures of the accompanying drawings in which like references indicate similar elements.

DETAILED DESCRIPTION

The disclosed embodiments describe devices, methods, and computer-readable media for detecting the presence of beings trapped in vehicles using an ML model. By using an ML model and in-vehicle cameras, the disclosed embodiments can more reliably predict the presence of beings in vehicles. In response to detecting a being locked within a vehicle, the disclosed embodiments further describe techniques for assisting such a being without assistance from a driver of the vehicle.

Figure 1:
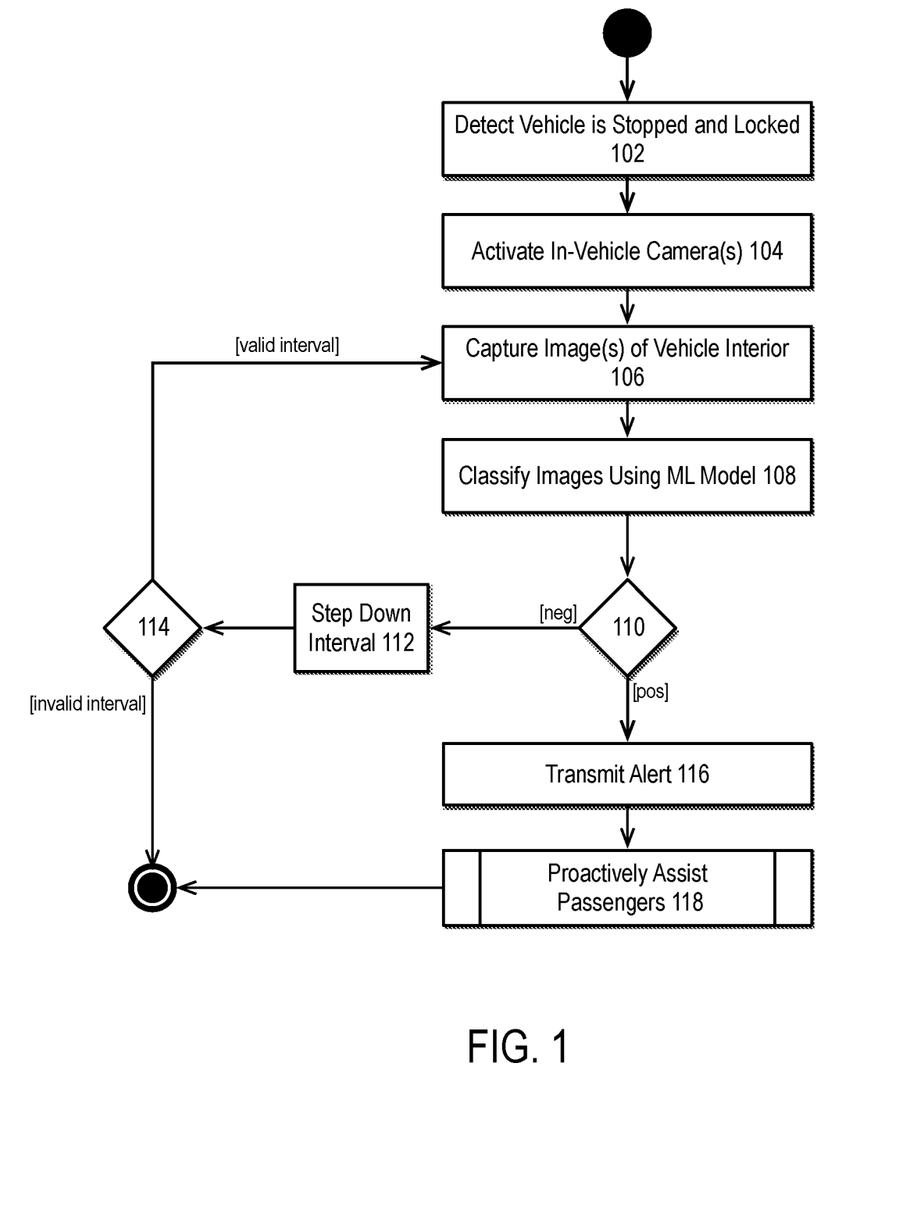
FIG. 1 is a flow diagram illustrating a method for detecting a presence of a being in a locked vehicle according to some embodiments of the disclosure.

FIG. 1 is a flow diagram illustrating a method for detecting a presence of a being in a locked vehicle according to some embodiments of the disclosure.

In block 102, the method detects that a vehicle is stopped. In some embodiments, the method further detects (in block 102) whether a vehicle is locked after being stopped.

In one embodiment, the method receives signals over a communications bus (e.g., controller area network) that indicate when a vehicle is stopped, in park, and/or locked. In the illustrated embodiment, these signals are monitored on the bus and used to determine when to initiate the remaining blocks of the method.

In a first embodiment, the method may execute the remaining blocks upon determining that a vehicle has stopped. In this embodiment, the method may (as one example) monitor the speed of the car and determine that the vehicle has stopped when the speed is at or close to zero. Alternatively, or in conjunction with the foregoing, the method may analyze signals indicating that a brake has been depressed.

In a second embodiment, the method may determine whether a vehicle is placed in park. In some embodiments, this embodiment can be performed after determining that the vehicle has stopped or may be performed independently. In one embodiment, the method determines that a vehicle is in park by detecting a signal generated by a transmission control unit transmitted in response to the driver placing the vehicle in park. Other signals may be used alone or in combination with such a technique, these signals including the use of automated parking assist or other similar technologies.

In a third embodiment, the method may determine whether one or more doors of a vehicle are locked. In some embodiments, this embodiment can be performed after determining that the vehicle has stopped or after the vehicle is in park. Alternatively, this third embodiment may be performed independently. In one embodiment, the method monitors the bus for a signal from a door lock control unit that indicates the user has locked the doors. This signal may be generated in response to detecting a user has locked the doors via a remote key fob, mobile application, or other device.

In some embodiments, a vehicle may be configured to provide a dedicated signal used to proceed to the remaining blocks. In this embodiment, the vehicle broadcasts a start signal over a bus which causes the method to proceed. In one embodiment, this start signal can be issued after the vehicle internally executes any one or more of the three embodiments described above. Thus, the three embodiments above may still be executed but may be executed by the operating system of the vehicle and not the method.

In block 104, the method activates one or more in-vehicle cameras.

In the illustrated embodiment, block 104 is only executed after a positive determination in block 102. That is, the in-vehicle cameras are only activated after a vehicle is stopped and, if implemented, locked, and parked. Alternatively, in some embodiments, the in-vehicle cameras may be used by other applications during the operation of a vehicle. In this scenario, the method re-uses these in-vehicle cameras when the vehicle is locked.

In one embodiment, activating a camera comprises initiating the camera for operation. The specific steps of activating a camera are unique to each type of camera and the details of such specific processes are not included herein. In one embodiment, the activating of a camera may additionally comprise focusing or moving the camera field of view based on a set of rules or preferences for camera placement. For example, a camera embedded in the center windshield can be moved to focus on the front passenger seat thus removing at least part of the driver seat from the field of view. By making this adjustment, the camera can record more of a seat of interest (containing a potential passenger).

In some embodiments, a separate model can be used to orient in-vehicle cameras. Specifically, an ML model that can recognize vehicle features may be used to orient the cameras. That is, the cameras can be moved and frames analyzed until the ML model predicts that the camera has focused on a desired area (e.g., a specific seat).

In other embodiments, the activation of a camera can comprise setting the cameras to continuously record until stopped. Alternatively, or in conjunction with the foregoing, the activation can also (if possible) cause the cameras to pivot or move to capture as much of the possible field of view as technically possible.

In block 106, the method captures images of a vehicle interior.

In one embodiment, the method is executed by a dedicated processor that receives raw image frames from individual cameras. Each of these frames may be timestamped by the camera device or by the processor. As a result, the method receives a set of one or more frames for various timepoints while the vehicle is locked.

In some embodiments, as part of block 106, the method may pre-process frames to improve the prediction accuracy of the ML model (discussed in block 108). In one embodiment, the method can clean images to remove artifacts or other noisy elements. For example, the method can apply one or more transformations to remove structural elements of the vehicle interior (e.g., windows, doors) while retaining pixels capturing the seats of the vehicle. In some embodiments, this pre-processing is optional.

In block 108, the method classifies the image using an ML model.

In the illustrated embodiment, the ML model comprises a predictive model trained using classified data. In one embodiment, the ML model comprises a neural network such as an artificial neural network (ANN), convolutional neural network (CNN), recurrent neural network (RNN), auto encoder, etc. In the illustrated embodiment, the number of layers of the model may be configured based on experimentation and training. Alternatively, the predictive model may comprise a non-neural network such as a support vector machine (SVM), decision tree, or naïve Bayes classifier.

In the illustrated embodiment, the ML model is trained using classified image data. Specifically, images of beings in a vehicle are recorded and labeled as containing such beings. These labeled images are used to train the ML model which ultimately generates a set of weights (e.g., in the case of a neural network) and other model parameters. These parameters are then stored by the vehicle and used to predict whether new images contain beings. In some embodiments, the in-vehicle network can be configured to re-train the network based on actual images captured and confirmed labels. For example, if the ML model predicts a being is present and alerts authorities (see FIG. 4), but later the prediction is identified as a false positive, these images can be properly classified and used to re-train the ML model.

In one embodiment, the ML model can comprise a model that detects beings, regardless of location. In this embodiment, the ML model is trained using pictures of beings generally and can be rapidly trained using any image data including humans or animals. In some embodiments, existing ML models may be re-used (and enhanced) in this embodiment.

In another embodiment, the ML model can comprise a model that is trained using images of beings in vehicles. In this embodiment, the training dataset only include data recorded within vehicles and does not include any images outside of vehicles. Such a training process provides improved performance since the model parameters are fine-tuned to automotive contexts.

In another embodiment, the ML model can comprise a model that is trained using images of beings in a specific make and/or model of a vehicle. This embodiment is similar to the previous model, however the training data is generated on a per-vehicle basis. In some embodiments, the model can be generated by a manufacturer during production and then installed in each manufactured vehicle. In this embodiment, the manufacture can generate a set of images for each model of a vehicle and use this data to train the ML model.

In some embodiments, the ML models can further be fine-tuned based on the location of cameras. For example, separate ML models may exist for each camera placement. Combined with the previous examples, these per-camera models may also be generated on a make/model basis. Thus, a given make or model of a vehicle may have multiple models for each placement of a camera. In some embodiments, the ML models stored in a memory system of the vehicle and used for predicting the presence of beings will then vary depending on the make and model of vehicle as well as the specific locations of cameras in the vehicle. In other embodiments, the ML model may be stored in the memory of an individual camera.

Alternatively, or in conjunction with the foregoing, the ML models described above may be stored remotely. In this embodiment, a central server manages all ML models. Thus, when images are captured in block 106, these images are transmitted to the central server for classification. The central server then returns the classification result to the vehicle. In this manner, the system minimizes the total number of ML models and can centralize model training and re-training, thus rapidly improving the prediction accuracy of the model.

Alternatively, or in conjunction with the foregoing, the models generated by the central server can be distributed to the relevant vehicles. In this embodiment, the server can periodically update the in-vehicle ML models as the models are refined. In this manner, the central server can leverage the extensive data collected while individual in-vehicle models can be used for rapid prediction (including prediction in areas without access to wide area, e.g., cellular, network).

In block 110, the method analyzes the result of the ML classification. The classification analyzed in block 110 generally comprises either a positive classification (i.e., a passenger is detected in a vehicle) or a negative classification (i.e., no passengers were detected). In some embodiments, the classification is further associated with a confidence level. In this scenario, the method may only use positive classifications with a confidence level above a pre-configured threshold. This threshold may be stored in a vehicle or user profile or rules setting.

In block 112, upon detecting a negative classification (i.e., no passengers detected), the method steps down an interval.

In one embodiment, this interval controls when the method should stop (or pause) capturing images. Specifically, in some embodiments, it is a waste of computing resources and energy to continuously capture images in a vehicle when no beings are locked inside. For example, when a driver parks their car for the day at work. As another example, parking a car during the evening after returning from work would result in a significant length (e.g., fourteen hours) of recording and processing time.

To avoid this overfitting, the method uses an interval that controls how frequently block 106 (and subsequent blocks) should be executed. In one embodiment, this interval is set to a very short time period (e.g., one second) when a vehicle is first parked. In block 112, the method begins to increase the interval length as negative classifications are received. In some embodiments, the method exponentially increases the interval length such that the length increases slowly immediately after parking and quickly increases as negative classifications are received. Other increasing functions may be used (e.g., power or linear functions).

In block 114, the method determines if the interval is still valid. In some embodiments, the method determines that an interval is valid if the length of the interval is less than a preconfigured value. This value may be stored in a user or vehicle profile or rules setting. As an example, the method may stop processing when the interval is set to thirty minutes. If the interval is within the preconfigured length, the method continues to process images at block 106 et seq. Alternatively, when the interval exceeds the preconfigured length, the method stops recording images and ends. If an exponentially increasing interval is used, the interval will quickly increase such that the method effectively stops recording images and only maintains a timer after a few iterations.

In some embodiments, block 114 is optional. In this embodiment, the method increases the interval according to the increase function and continues to capture images based on the increasing interval.

In some embodiments, the interval mechanism may not be used and the method may alternatively use other sensors to determine when to execute block 106. For example, the method may use motion or weight sensors to determine when to operate block 106. That is, block 106 may executed when weight is detected on a seat or when motion in the vehicle is detected. In some embodiments, the interval processing may also be used with these interrupt-style events. In this manner, the method can be combined with weight or motion sensing techniques to improve being detection.

In block 116, after the method detects a being in a vehicle, the method transmits an alert.

In some embodiments, block 116 is optional. If implemented, the method may transmit an alert to a driver of the vehicle. In some embodiments, a vehicle maintains a profile of the driver which includes contact information such as a mobile phone number, user account id, email address, or other data. The method uses this contact information to transmit an alert over a wide area network (e.g., cellular network) via a radio interface. In one embodiment, the alert can comprise a text (SMS) message or similar message. In other embodiments, a driver's mobile device contains a mobile application and the alert can comprise a push notification to the user's mobile device.

In block 118, the method proactively assists passengers.

In some embodiments, block 118 is optional. However, in the illustrated embodiment, either block 116 or block 118 is performed, while in some embodiments both blocks are performed. In block 118, the method proactively operates one or more vehicle subsystems to assist the detected passengers. Various details of these operations are described in more detail in the following FIGS. 2 through 4, the disclosure of which is not repeated herein.

Figure 2:
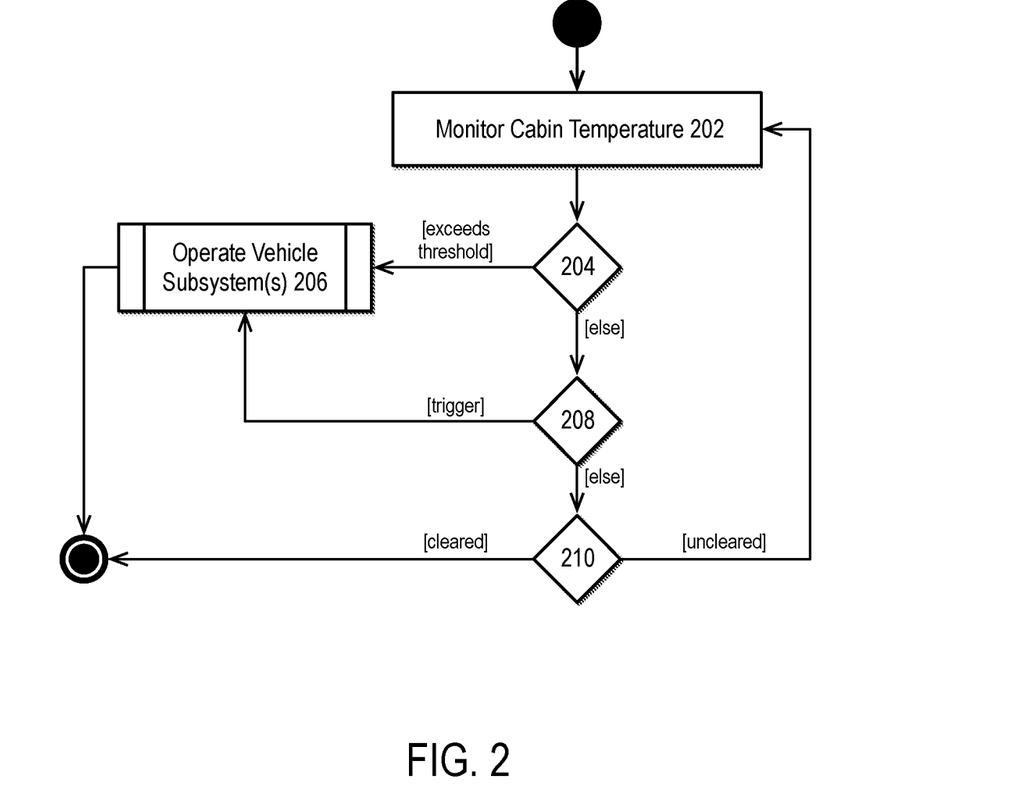
FIG. 2 is a flow diagram illustrating a method for automatically operating a vehicle in response to detecting a being locked within the vehicle according to some embodiments of the disclosure.

FIG. 2 is a flow diagram illustrating a method for automatically operating a vehicle in response to detecting a being locked within the vehicle according to some embodiments of the disclosure.

In block 202, the method monitors a cabin temperature of a vehicle.

In the illustrated embodiment, a vehicle is equipped with one or more in-vehicle temperature sensors that continuously monitor the instant temperature inside a vehicle cabin. In some embodiments, a vehicle can have multiple temperature sensors mounted at different locations. In the illustrated embodiment, the method monitors the temperatures reported by these sensors. In some embodiments, the method averages the readings of multiple sensors (if multiple sensors are installed). In other embodiments, the method selects the highest value recorded by the sensor (if multiple sensors are installed). In some embodiments, each camera can be equipped with a temperature sensor and thus the number of temperature readings will equal the number of cameras.

In some embodiments, the method may use external temperature sensors in addition to, or in lieu of, in-cabin sensors. As used herein an external temperature sensor refers to a temperature sensor installed outside the cabin. In this embodiment, the method can use the external temperature to predict the internal temperature. In some embodiments, this prediction can be done using a temperature prediction model. In this embodiment, the temperature prediction model can be trained using external and corresponding internal temperatures recorded by the vehicle during operation (or otherwise). Alternatively, in one embodiment, the method can proceed based solely on the external temperature. For example, a rule or setting may indicate that the method should proceed if the external temperature is above a preconfigured threshold (regardless of the cabin temperature).

In block 204, the method determines if the cabin temperature exceeds a predefined threshold. In one embodiment, the method compares the measured cabin temperature identified in block 202 to the predefined threshold. Alternatively, the method may compare an outdoor (external) temperature to a predefined outdoor threshold. In some embodiments, these thresholds may be set by the manufacturer or may be set by the driver or owner of the vehicle.

In block 206, the method operates one or more vehicle subsystems when the temperature exceeds the predefined threshold. In the illustrated embodiment, these subsystems may include an air conditioning system, a window subsystem, a communications subsystem, or other subsystem. Details of operating such subsystems are provided in FIGS. 3 and 4 and are only briefly describe below.

In one embodiment, the method open one or more windows of the vehicle in block 206. In this embodiment, the method uses an electronic control unit (ECU) associated with a given window to open or lower the window. In some embodiments, the method can further identify a window closest to the being locked in the vehicle based on an identity of the camera that detected the user.

In another embodiment, the method can operate the heating, ventilation, and air conditioning (HVAC, or, AC) system of the vehicle. In this embodiment, the method can operate the AC system to regulate the temperature to a desired level. In some embodiments, this may be set by the owner of the vehicle.

In another embodiment, the method may transmit a notification to an emergency system. For example, the method may dial 9-1-1 (in the United States) and play a pre-recorded message. In other embodiments, E911 services may be used. In some embodiments, the method can report the global positioning (GPS) coordinates of the vehicle as well as the number of occupants and length of time in the car via a text-to-speech processing module.

In another embodiment, the method can operate a horn or lights of the vehicle to attempt to draw attention to the vehicle. Certainly, other types of subsystems may be operated and the foregoing examples are not intended to limit the breadth of the disclosure. Further, the foregoing examples (and other examples) may be combined in various manners.

In block 208, the method determines if an alternative trigger was enabled upon determining that the temperature does not exceed the preconfigured threshold.

In the illustrated embodiment, after determining that the temperature has not exceeded the threshold, the method may then determine if the method should, nevertheless, proceed to operate the vehicle subsystems. In block 208, other sensor types may be used to determine if a trigger has occurred.

For example, humidity sensors may be used to detect the presence of excess humidity (due to exhalation). In this embodiment, the method determines if the current humidity level is greater than a preconfigured threshold. Alternatively, the method may monitor the humidity level over time to determine if there is a constant increase in humidity.

As another example, the method may monitor sound levels in the vehicle. Generally, if passengers are in the vehicle and the sound level is low, the method may determine to not operate the vehicle subsystems. However, if the sound level is high this may indicate a passenger shouting for assistance. Thus, the method would use the sound level (in decibels) as a triggering value and operate the vehicle subsystems (block 206) when the sound level exceeds a threshold.

As another example, a timer may be used to trigger block 206. In this embodiment, the owner or manufacturer of a vehicle may set a fixed time in which persons should be left in a locked vehicle. For example, a timer may be set to trigger block 206 after fifteen minutes of being continuously locked in a vehicle. Certainly, other values may be used.

As another example, the operation of components of the vehicle while locked may trigger block 206. For example, after a driver locks a vehicle and exits, the method may monitor the operation of the vehicle to determine if suspicious activities occur that involve control systems of the vehicle. For example, the depression of a horn or attempting to open a door after the vehicle is parked and locked may be used to trigger block 206.

These examples may be combined in any manner, and other examples may be implemented based on the properties of a vehicle. The foregoing examples should not be construed as limiting the embodiments.

In block 210, the method determines if the monitoring procedure should be cleared. In the illustrated embodiment, block 210 is executed after the method determines that the temperature and external triggers do not cause the method to operate a vehicle subsystem. In the illustrated embodiment, block 210 detects that the method should be cleared when the vehicle is unlocked and/or started. In other words, the method illustrated in FIG. 3 is configured to operate until an emergency is detected (triggering block 206) or the owner/operator of the vehicle returns and unlocks the vehicle.

Figure 3:
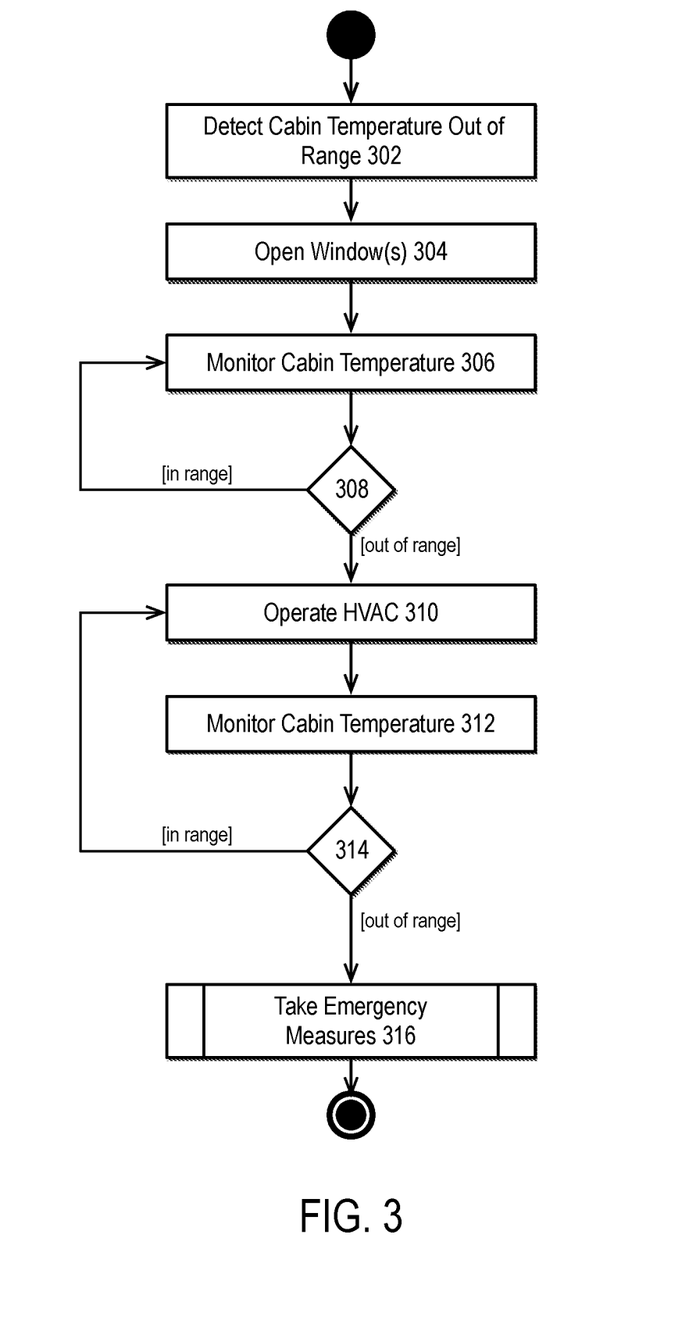
FIG. 3 is a flow diagram illustrating a method for operating vehicle subsystems in response to detecting a temperature out of range condition according to some embodiments of the disclosure.

FIG. 3 is a flow diagram illustrating a method for operating vehicle subsystems in response to detecting a temperature out of range condition according to some embodiments of the disclosure.

In block 302, the method determines if the cabin temperature of a vehicle is out of range. In the illustrated embodiment, out of range refers to the temperature being above a threshold (in the event of heat) or below a threshold (in the event of cold). Details of this detection can be found in the description of FIG. 2 and, specifically, blocks 202 and 204.

In block 304, the method opens one or more windows of the vehicle. In the illustrated embodiment, a processor transmits an instruction to a window ECU to cause the window to open. In some embodiments, the method transmits this instruction to all windows of the vehicle. In some embodiments, the instruction causes the window to either open partially or open completely.

In the illustrated embodiment, block 304 is configured to execute first. In this embodiment, block 304 may configured to execute when the monitored temperature is between a first threshold and second threshold. These thresholds define a first range over the first threshold wherein the opening of windows will sufficiently lower the temperature to a desired range.

In block 306, the method continues to monitor the cabin temperature after opening the windows. This may be done in the same manner described in block 302 and in blocks 202 and 204 of FIG. 2.

In block 308, the method determines if the monitored temperature is within range. As used in block 308, a cabin temperature is in range when it is between the first and second thresholds defined previously. That is, the opening of windows has prevented the internal temperature from exceeding the second threshold. In most embodiments, this second threshold is not crossed when the temperature is not excessively hot and opening the windows provides adequately relief.

However, in some situations, opening the windows will not adequately lower the cabin temperature. Additionally, the method illustrated in FIG. 3 may be adjusted for cold weather conditions. In cold weather conditions, blocks 304 and 306 are not executed and instead the method proceeds directly to attempting to use the HVAC system to regulate the temperature.

If the temperature is within range, the method continues to monitor the temperature. This monitoring may continue until the temperature is out of range or the vehicle is unlocked (described in FIG. 2). In one embodiment (not illustrated), the method can also determine if the temperature has returned below the first threshold. If so, the method may operate the windows to close each window and return to block 302 when the temperature is out of range again.

In block 310, the method operates the HVAC system of the vehicle.

In the illustrated embodiment, the HVAC system of a vehicle refers to any components configured to heat or cool a vehicle via, for example, forced air. Additionally, the HVAC system may include any heating or cooling elements such as seat heating or cooling elements.

In block 310, during warm weather conditions, the method determines that the opening of the windows has not resulted in lowering or maintaining the temperature of the cabin. Thus, the method operates the air conditioning system of the vehicle to further cool the vehicle. In some embodiments, the method may also raise the windows of the vehicle when operating the air conditioning system. Conversely, during cold weather conditions, the method starts the heating system of the vehicle to begin heating the vehicle.

In block 312, the method monitors the cabin temperatures while running the HVAC system. This may be done in the same manner described in block 302 and in blocks 202 and 204 of FIG. 2.

In block 314, the method determines if the cabin temperature is within a second range. In one embodiment, the second range comprises the second threshold (described in block 308) and a third threshold. In warm weather conditions, the third threshold is greater than the second while in the cold weather conditions the third threshold is lower than the second threshold. As with the first and second thresholds, the third threshold can be set by the manufacturer or may be stored in a profile set by the owner of the vehicle.

If the monitored temperature is still in range, the method continues to operate the HVAC system in block 310. In some embodiments, not illustrated, the method may also stop operating the HVAC system if the temperature is changed to be between the first and second thresholds. In this scenario, the method may return to block 306 to monitor the cabin temperature without operating the HVAC system.

In block 316, the method takes emergency measures when the temperature cannot be maintained via the foregoing blocks. In this scenario, the opening of windows and operating of the HVAC system failed to maintain the cabin temperature at an acceptable level. In general, block 316 will primarily be executed in extreme temperature scenarios (e.g., extremely hot or cold weather) or long durations (i.e., when the operations have expended available energy in the form of gasoline or battery). Details of taking emergency measures are provided in the description of FIG. 4, which are incorporated herein.

Figure 4:
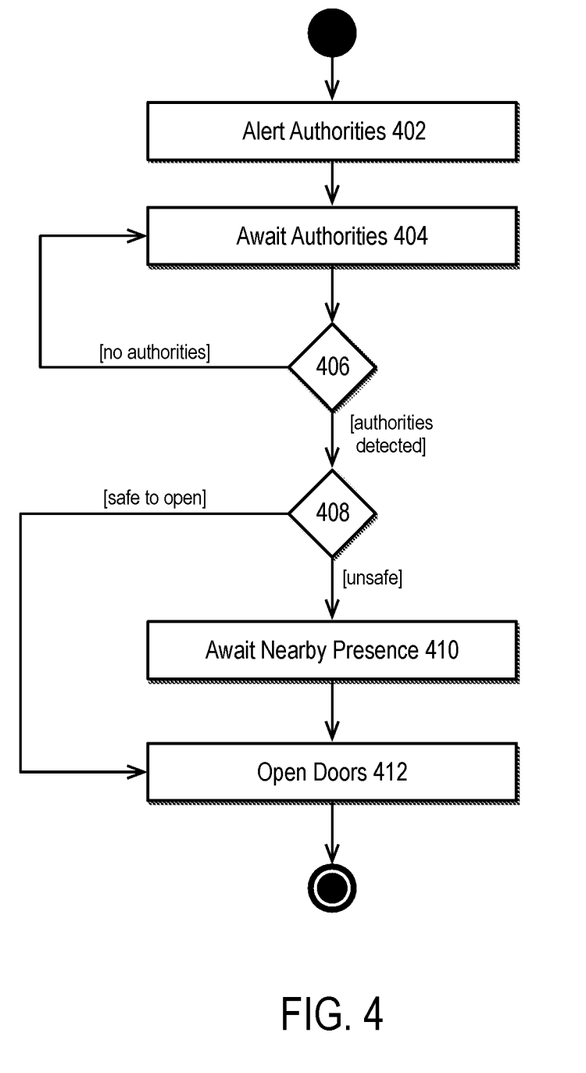
FIG. 4 is a flow diagram illustrating a method for taking emergency measures upon detecting a trapped passenger according to some embodiments of the disclosure.

FIG. 4 is a flow diagram illustrating a method for taking emergency measures upon detecting a trapped passenger according to some embodiments of the disclosure.

In block 402, the method alerts authorities. As described in FIG. 3, block 402 may executed upon detecting that the vehicle cannot adequately regulate the cabin temperature while a passenger is locked within a vehicle. In alternative embodiments, the method in FIG. 4 may be executed separate from the temperature control routines.

In the illustrated embodiment, the method alerts authorities by transmitting an alert to an emergency system. In some embodiments, this comprises transmitting a text (SMS) message or similar message to a designated emergency system. In other embodiments, the vehicle may automatically initiate a cellular telephone call (e.g., 9-1-1 or E-911) to an emergency dispatcher system. If using (E)911, the vehicle may generate an automated message to play to dispatchers. For example, the message can include a license plate number, GPS coordinates, current temperature, length of time the vehicle has been locked, and other details. This message can be played upon detecting a connection with the dispatcher.

In some embodiments, the method can implement an interactive voice response (IVR) system. This system can allow an emergency dispatcher to control the vehicle via the emergency call. For example, the IVR system can allow the access cameras in the vehicle as well as external cameras. The IVR system can also allow the dispatcher to open a door of the vehicle after verifying a safe location in which the door can be opened. In some embodiments, the IVR system can allow the dispatcher to enter GPS coordinate in which the vehicle should drive to (if the vehicle is autonomous).

In block 404, the method awaits emergency responders until detecting (block 406) that the emergency responders have arrived.

In the illustrated embodiment, the method awaits responders after alerting authorities. In one embodiment, the method can utilize various sensors to determine that emergency personnel have arrived. For example, the method can use one or more exterior cameras to determine if emergency personnel have arrived. In one embodiment, a trained model can be used to distinguish between other objects and emergency personnel. In other embodiments, microphone sensors may be used to identify the presence of sirens or other signals and use this presence to detect emergency personnel.

In block 408, the method determines if it is safe to open a door of the vehicle. In one embodiment, the method can utilize cameras or GPS coordinates to orient the vehicle with respect to a road or other dangers. For example, if the vehicle is parked along a street, the method can determine on which side of the vehicle the sidewalk is on and open a door on this side of the street.

In block 410, the method determines that it cannot confirm that any door is safe to open and thus awaits the nearby presence of personnel. In one embodiment, this may be due to road conditions or other conditions external to the vehicle. In this scenario, the method can utilize sensors such as radar, sonar, or Lidar sensors to confirm that emergency personnel are nearby. In this scenario, the method can open a door (block 412) closest to the emergency personnel to allow passengers to exit or allow emergency personnel to enter the vehicle. As illustrated, if, in block 408, the method determines that it is safe to open the door upon detecting emergency personnel, the method may immediately open a door.

Figure 5:
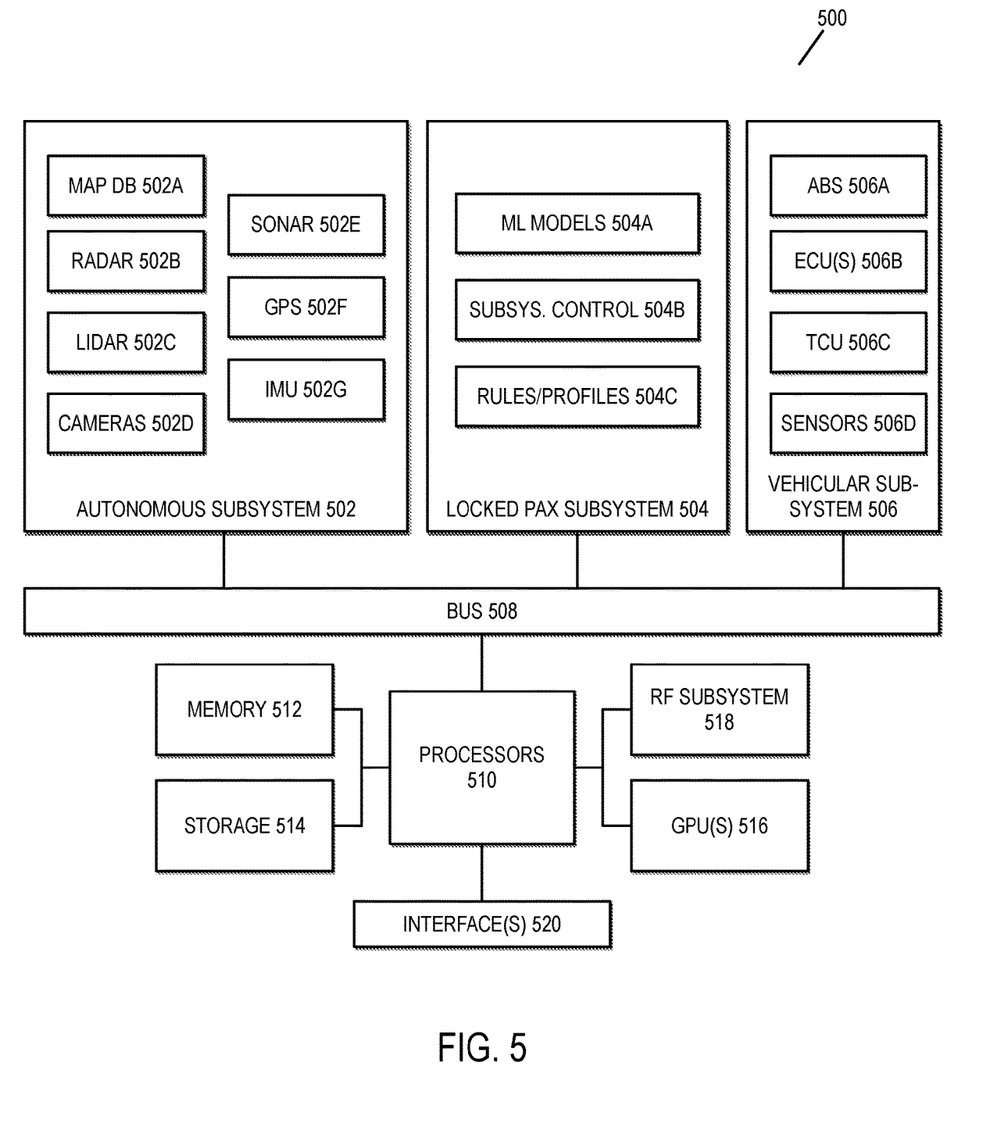
FIG. 5 is a block diagram illustrating a vehicular computing system according to some embodiments of the disclosure.

FIG. 5 is a block diagram illustrating a vehicular computing system according to some embodiments of the disclosure.

The system illustrated in FIG. 5 may be installed entirely within a vehicle. In some embodiments, some components (e.g., components and subsystems other than subsystem (504)) may comprise existing autonomous and non-autonomous vehicle subsystems.

The system optionally includes an optional autonomous vehicle subsystem (502). In the illustrated embodiment, autonomous vehicle subsystem (502) includes map database (502a), radar devices (502b), Lidar devices (502c), digital cameras (502d), sonar devices (502e), GPS receivers (502f), and inertial measurement units (502g). Each of the components of an autonomous vehicle subsystem (502) comprise standard components provided in most current autonomous vehicles. In one embodiment, map database (502a) stores a plurality of high-definition three-dimensional maps used for routing and navigation. Radar devices (502b), Lidar devices (502c), digital cameras (502d), sonar devices (502e), GPS receivers (502f), and inertial measurement units (502g) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality. In some embodiments the autonomous subsystem (502) is built into the vehicle while in other embodiments the autonomous subsystem (502) comprises an aftermarket system.

Vehicular subsystem (506) is additionally included within the system. Vehicular subsystem (506) includes various anti-lock braking systems (506a), engine control units (502b), and transmission control units (502c). These components may be utilized to control the operation of the vehicle in response to the data generated by autonomous vehicle subsystem (502) and/or ADAS subsystem (504). The standard autonomous vehicle interactions between autonomous vehicle subsystem (502) and vehicular subsystem (506) are generally known in the art and are not described in detail herein.

The processing side of the system includes one or more processors (510), short-term memory (512), an RF system (518), graphics processing units (GPUs) (516), long-term storage (518) and one or more interfaces (520).

The one or more processors (510) may comprise central processing units, FPGAs, or any range of processing devices needed to support the operations of the autonomous vehicle. Memory (512) comprises DRAM or other suitable volatile RAM for temporary storage of data required by processors (510). RF system (518) may comprise a cellular transceiver and/or satellite transceiver. Long-term storage (514) may comprise one or more high-capacity solid-state drives (SSDs). In general, long-term storage (514) may be utilized to store, for example, high-definition maps, routing data, and any other data requiring permanent or semi-permanent storage. GPUs (516) may comprise one more high throughput GPU devices for processing data received from autonomous vehicle subsystem (502a). Finally, interfaces (520) may comprise various display units positioned within the autonomous vehicle (e.g., an in-dash screen).

The system additionally includes a locked passenger subsystem (504) which performs the operations required by the methods illustrated in the preceding Figures. The black box subsystem (504) includes a machine learning model (504a) that stores the being detection model described primarily in the description of FIG. 1 (the details of which are incorporated herein and not repeated). The black box subsystem (504) includes a subsystem control module (504b) that operates various subsystems of the vehicle (as described in the description of FIGS. 2-4) and a set of rules or profiles (504c) that control the operation of the subsystem control model. Details of the subsystem control module (504b) and the rules/profiles (504c) are described more fully in the description of FIGS. 2 through 4, the disclosure of which is not repeated herein.

In some embodiments, it is to be understood that the steps of methods described above can be implemented as a continuous process such as each step can run independently by monitoring input data, performing operations and outputting data to the subsequent step. Also, such steps for each method can be implemented as discrete-event processes such as each step can be triggered on the events it is supposed to trigger and produce a certain output. It is to be also understood that each figure represents a minimal method within a possibly larger method of a computer system more complex than the ones presented in the description. Thus, the steps depicted in each figure can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors, and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving signaling from a transmission control unit (TCU) of a vehicle, the signaling indicating that the vehicle has stopped, was placed in a parked state, and was locked after a driver of the vehicle exited the vehicle;
    activating at least one camera;
    adjusting a field of view of the at least one camera responsive to receiving the signaling;
    recording at least one image of an interior of the vehicle using the at least one camera in response to receiving the signaling while the vehicle is in the parked state;
    classifying the at least one image using a machine learning model;
    operating at least one subsystem of the vehicle in response to detecting that classifying indicates that a person or animal is present in the at least one image; and
    stepping down a frequency of classifying in response to detecting that classifying does not indicate that the person or the animal is present in the at least one image, the stepping down comprising one or both of lengthening an amount of time in between capturing later images of the interior of the vehicle and classifying the later images using the machine learning model, the amount of time determined as a fraction of a preconfigured value stored in a vehicle profile, wherein the stepping down is performed iteratively until the amount of time exceeds the preconfigured value.

2. The method of claim 1, the detecting that the vehicle is stopped comprising detecting that the vehicle is not running and one or more doors of the vehicle are locked.

3. The method of claim 1, the classifying the at least one image using the machine learning model comprising classifying the at least one image using a neural network.

4. The method of claim 1, further comprising recording a second image in response to determining that the at least one image does not include a person or animal.

5. The method of claim 1, the operating the at least one subsystem comprising monitoring a temperature of the vehicle and operating the at least one subsystem in response to detecting that the temperature exceeds a pre-defined threshold.

6. The method of claim 5, the operating the at least one subsystem comprising operating an air conditioning system of the vehicle.

7. The method of claim 5, the operating the at least one subsystem comprising opening at least one window of the vehicle.

8. The method of claim 5, the operating the at least one subsystem comprising transmitting an alert to an emergency system.

9. A non-transitory computer-readable storage medium for tangibly storing computer program instructions capable of being executed by a computer processor, the computer program instructions defining the steps of:
    receiving signaling from a transmission control unit (TCU) of a vehicle, the signaling indicating that the vehicle has stopped, was placed in a parked state, and was locked after a driver of the vehicle exited the vehicle;
    activating at least one camera;
    adjusting a field of view of the at least one camera responsive to receiving the signaling;
    recording at least one image of an interior of the vehicle using the at least one camera in response to receiving the signaling while the vehicle is in the parked state;
    classifying the at least one image using a machine learning model;
    operating at least one subsystem of the vehicle in response to detecting that classifying indicates that a person or animal is present in the at least one image; and
    stepping down a frequency of classifying in response to detecting that classifying does not indicate that the person or the animal is present in the at least one image, the stepping down comprising one or both of lengthening an amount of time in between capturing later images of the interior of the vehicle and classifying the later images using the machine learning model, the amount of time determined as a fraction of a preconfigured value stored in a vehicle profile, wherein the stepping down is performed iteratively until the amount of time exceeds the preconfigured value.

10. The non-transitory computer-readable storage medium of claim 9, the detecting that the vehicle is stopped comprising detecting that the vehicle is not running and one or more doors of the vehicle are locked.

11. The non-transitory computer-readable storage medium of claim 9, the classifying the at least one image using the machine learning model comprising classifying the at least one image using a neural network.

12. The non-transitory computer-readable storage medium of claim 9, the instructions further defining the step of recording a second image in response to determining that the at least one image does not include a person or animal.

13. The non-transitory computer-readable storage medium of claim 9, the operating the at least one subsystem comprising monitoring a temperature of the vehicle and operating the at least one subsystem in response to detecting that the temperature exceeds a pre-defined threshold.

14. The non-transitory computer-readable storage medium of claim 13, the operating the at least one subsystem comprising operating an air conditioning system of the vehicle.

15. The non-transitory computer-readable storage medium of claim 13, the operating the at least one subsystem comprising opening at least one window of the vehicle.

16. The non-transitory computer-readable storage medium of claim 13, the operating the at least one subsystem comprising transmitting an alert to an emergency system.

17. An apparatus comprising:
    a processor; and
    a storage medium for tangibly storing thereon program logic for execution by the processor, the stored program logic causing the processor to perform the operations of:
        receiving signaling from a transmission control unit (TCU) of a vehicle, the signaling indicating that the vehicle has stopped, was placed in a parked state, and was locked after a driver of the vehicle exited the vehicle, activating at least one camera, adjusting a field of view of the at least one camera responsive to receiving the signaling, recording at least one image of an interior of the vehicle using the at least one camera in response to receiving the signaling while the vehicle is in the parked state, classifying the at least one image using a machine learning model, operating at least one subsystem of the vehicle in response to detecting that classifying indicates that a person or animal is present in the at least one image, and stepping down a frequency of classifying in response to detecting that classifying does not indicate that the person or the animal is present in the at least one image, the stepping down comprising one or both of lengthening an amount of time in between capturing later images of the interior of the vehicle and classifying the later images using the machine learning model, the amount of time determined as a fraction of a preconfigured value stored in a vehicle profile, wherein the stepping down is performed iteratively until the amount of time exceeds the preconfigured value.

18. The apparatus of claim 17, the detecting that the vehicle is stopped comprising detecting that the vehicle is not running and one or more doors of the vehicle are locked.

19. The apparatus of claim 17, the classifying the at least one image using the machine learning model comprising classifying the at least one image using a neural network.

20. The apparatus of claim 17, the operating the at least one subsystem comprising monitoring a temperature of the vehicle and operating the at least one subsystem in response to detecting that the temperature exceeds a pre-defined threshold, wherein the at least one subsystem comprises a subsystem selected from the group consisting of an air conditioning system, a window subsystem, and a communications subsystem.

\* \* \* \* \*